(12) United States Patent
Feldman et al.

(10) Patent No.: US 9,507,721 B2
(45) Date of Patent: Nov. 29, 2016

(54) DISK CACHE ALLOCATION

(71) Applicant: Seagate Technology LLC, Cupertino, CA (US)

(72) Inventors: Timothy R. Feldman, Louisville, CO (US); Andy Kowles, Lyons, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 212 days.

(21) Appl. No.: 14/336,970

(22) Filed: Jul. 21, 2014

(65) Prior Publication Data
US 2016/0019156 A1 Jan. 21, 2016

(51) Int. Cl.
*G06F 12/08* (2016.01)

(52) U.S. Cl.
CPC ....... *G06F 12/0871* (2013.01); *G06F 12/0848* (2013.01); *G06F 12/0895* (2013.01); *G06F 2212/6046* (2013.01)

(58) Field of Classification Search
CPC ........... G06F 12/0866; G06F 12/0253; G06F 3/0674; G06F 3/0676
See application file for complete search history.

(56) References Cited

U.S. PATENT DOCUMENTS

| | | | |
|---|---|---|---|
| 4,835,686 A | 5/1989 | Furuya et al. | |
| 5,809,560 A | 9/1998 | Schneider | |
| 6,018,789 A * | 1/2000 | Sokolov | G06F 3/061 711/113 |
| 6,148,368 A | 11/2000 | DeKonig | |
| 7,965,465 B2 | 6/2011 | Sanvido et al. | |
| 7,996,623 B2 | 8/2011 | Walker | |
| 8,489,817 B2 | 7/2013 | Flynn et al. | |
| 8,593,748 B1 * | 11/2013 | Bandic | G11B 5/09 360/31 |
| 8,621,145 B1 | 12/2013 | Kimmel et al. | |
| 2003/0028740 A1 * | 2/2003 | Challenger | G06F 12/023 711/170 |
| 2012/0221797 A1 * | 8/2012 | Chung | G06F 12/0853 711/131 |
| 2013/0246703 A1 * | 9/2013 | Bandic | G11B 5/012 711/113 |
| 2014/0006707 A1 * | 1/2014 | Bandic | G06F 12/08 711/113 |
| 2014/0129779 A1 * | 5/2014 | Frachtenberg | G06F 12/123 711/136 |
| 2015/0169460 A1 * | 6/2015 | Zaw | G06F 12/0866 711/113 |
| 2015/0301747 A1 * | 10/2015 | Sokolov | G06F 3/0608 711/173 |
| 2015/0318022 A1 * | 11/2015 | Sutardja | G11B 27/36 360/31 |
| 2015/0378621 A1 * | 12/2015 | Bruner | G06F 3/0619 711/114 |

\* cited by examiner

*Primary Examiner* — Ryan Bertram
(74) *Attorney, Agent, or Firm* — HolzerIPLaw, PC

(57) ABSTRACT

Implementations disclosed herein provide a method comprising segregating a disk cache into a plurality of allocation units, and allocating the plurality of allocation units out-of-order.

20 Claims, 4 Drawing Sheets

DISK CACHE ALLOCATION

BACKGROUND

Data storage systems include data storage areas or locations serving as transient storage for host data for the purposes of performance or reliability enhancement of the device. Such temporary storage areas may be non-volatile and may be referred to as a cache. A storage controller of such data storage systems may use the various levels and types of cache to store data received from a host, cache read data from other, higher latency tiers of the storage device, and generally to improve the device performance. Alternatively, the systems may enhance data reliability in certain use cases by using the cache, for example, in case of a sudden or unexpected power loss. The data stored in media currently being written may be corrupted, but a back-up copy may be available in cache to maintain data integrity.

SUMMARY

Implementations disclosed herein provide a method comprising isolating a disk cache into a plurality of allocation units and allocating the plurality of allocated units out-of-order.

This Summary introduces a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

BRIEF DESCRIPTIONS OF THE DRAWINGS

DETAILED DESCRIPTION

Figure 1:
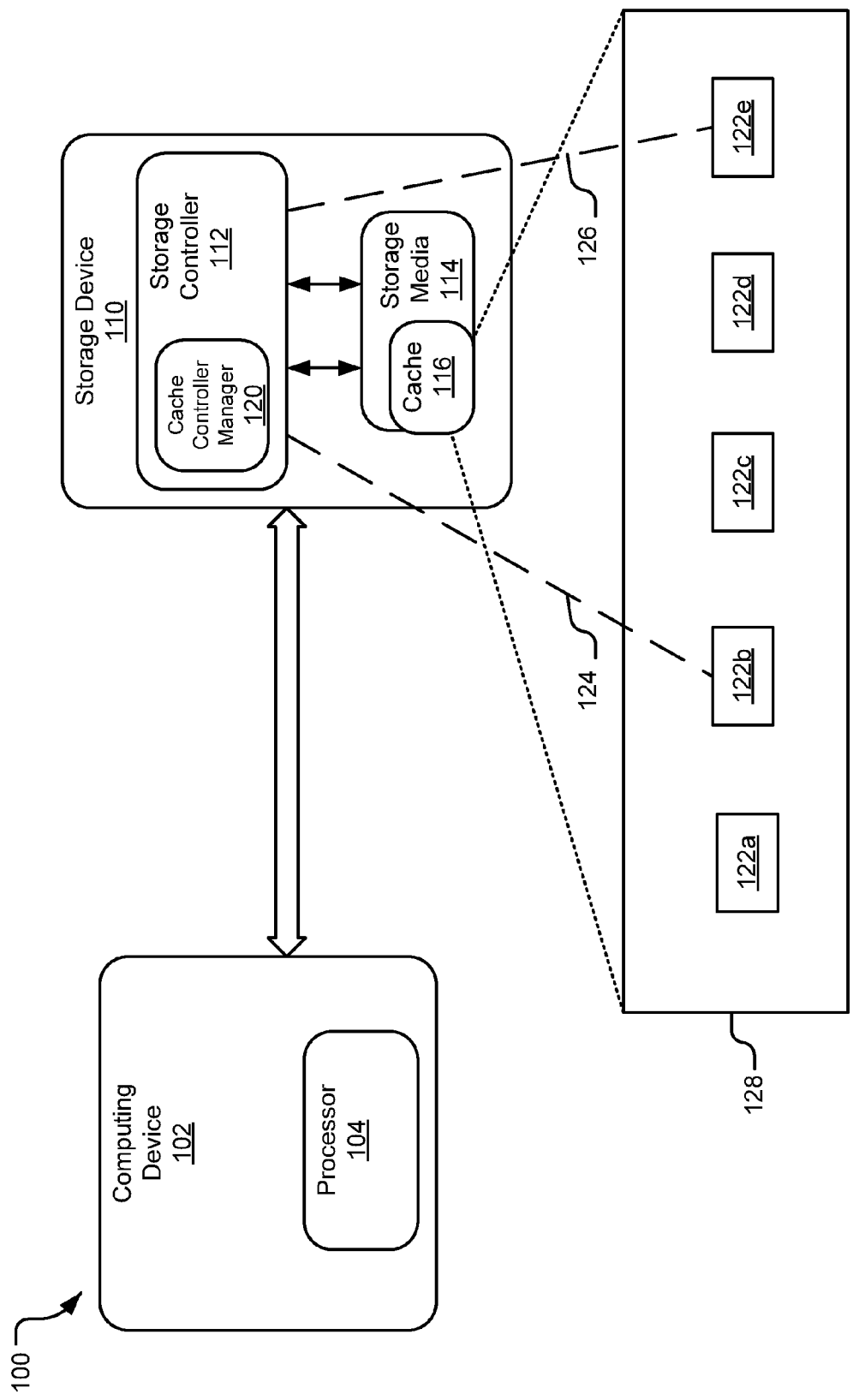
FIG. 1 illustrates a block diagram of an example data storage device system.

In hard disk drive (HDD) designs, disk-resident caching systems store host data to a temporary nonvolatile staging location located in a designated region of a disk area. This cache may be referred to as the disk cache or media cache. Specifically, the data may be stored in disk sectors, which are part of shingled magnetic recording (SMR) bands that have been designated as part of a disk cache. Disk cache may be used for a variety of purposes, such as storing data for write commands received from a host or computing device, storing read data in disk cache for a rewrite operation, etc.

When disc cache is used, a circular reuse method may be employed that governs both allocation of space for new data and cleaning or freeing of space populated with old, invalid, data. The data stored in the disk cache is managed as a queue using a front of queue pointer or element, and a back of queue pointer or element. As new data fills the cache, that data is written at the position of the back of queue pointer and the back pointer is advanced. When the pointer reaches the last physical unit of the disk cache it is wrapped around to the first physical unit of the disk cache (referred to as the "circular" method). As the data is moved from disk cache to its final destination, data is read at the position of the front of queue pointer and the front pointer is also similarly advanced circularly through the disk cache.

The circular buffer method has the property that the oldest data is the preferred data that should be next migrated or cleaned out of the cache. The oldest data at the front of the queue is likely to be data that has become stale due to arrival of new data in a write command in which case it is advantageous to reclaim that space because it requires the least work to do so; that is, stale data can simply be migrated from the cache. The oldest data, if it is not stale, is assumed to be less likely to become stale soon due to new data. Therefore, it can be advantageous to clean this old data from the disk cache and reclaim that space because the cleaning work is unlikely to be repeated soon.

The circular reuse method may be utilized in SMR. In SMR, data recording density on a disk is increased by writing a track of data to partially overlap an adjacent data track, resulting in a "shingled" track structure. One constraint of shingled magnetic recording is that when data is written to the magnetic media, it is written in sequentially increasing or decreasing radius tracks. The strong write field from the wide writer affects one or more adjacent tracks including the track being written to and one or more neighboring tracks in the shingling, or forward, direction.

By design in SMR systems, the write width is larger than the unit pitch. As a result, in order to change any data cell within a shingled unit while maintaining data integrity of all other data cells, all of the shingled data is re-written in the selected forward shingled sequential write order. Therefore, shingled media may be characterized as when it is written, all of the forward adjacent data elements must be rewritten. Another property of shingled media is that it can be circularly written/updated as long as the location where it is being written is displaced from what needs to be maintained as valid data by sufficient space according to the number of units that are affected by the wide writer.

Implementations disclosed herein use SMR in the physical disk cache. For example, in a disk cache using SMR, the circular use and reuse of disk cache physical resources occurs when either a host sends a signal to write commands to a controller or when the controller caches read data. The controller then adds data to the disk cache, which is written at the back of the queue. In the circular paradigm, the front of the queue must be advanced before any physical resources can be reused and in a disk cache using SMR the front must be advanced to be sufficiently far from the back of the queue such that data corruption of the front of queue, due to filling writes to the back of queue, does not occur.

The front of queue pointer will wrap around to the first physical unit of the cache, following the back of queue pointer. As a general example, adding a unit of data advances the back of queue pointer by one unit and removing two units of data advances the front by two units. The front of the queue advances as old data is removed from the cache either because the data is stale, the data is already clean (possibly because it is read cache data), the data is cleaned to another store (e.g., main store or backing store). All the physical space circularly forward from the front to the back of the queue is used as part of the cache's queue, and the space forward of the back of queue to the back to the front of the queue are unused. Thus, the front of queue advances due to data removal or migration at the front producing unused space and the back of queue advances due to data additions at the back consuming unused space.

By managing the use order of elements in a certain way, write forward corruption of valid data can be avoided when writing a particular unit. An implementation of circular method of using disk cache prevents write forward corruption in SMR by providing a structure of disk cache so as to have a "minimum safe distance" from write forward corruption between the back and front of the queue. Note that this minimum safe distance is meaningful when the queue wraps the physical cache. As a filling point approaches an emptying point in the physical address space, if the filling point is higher than the emptying point, then the queue is not "wrapping" the physical space. The emptying point can be at the start of the physical space and the filling point at the end, zero distance apart in the circular addressing but not violating a minimum safe distance. Conversely, if the emptying point is at a higher address, then the filling point cannot be allowed to come arbitrarily close. Therefore, a separation (or minimum safe distance) is needed. However, in such circular implementation, the back of the queue cannot advance beyond the front of the queue, which would potentially corrupt valid data. In other words, the front of queue pointer blocks access to the physical resources in front of it even when some of such resources or elements include stale data.

For example, consider the implementation described above including seven units 1-7 implemented using SMR with tracks overlapping in the direction from 1→7 (in other words, writing to a unit 6 will affect data in unit 7, and two tracks are needed for a minimum safe distance. Suppose at a time T1 the oldest data is in unit 4, the newest data is unit 1, and units 2 and 3 are unused. Unit 4 is the front of the queue and unit 1 is the back of the queue. Suppose at this time that unit 6 has stale data and unit 7 has non-stale data. In this case, even though unit 6 contains stale data, it may not be used, as writing to unit 6 will affect the non-stale data in unit 7 due to the SMR implementation. In this way, reuse of units in the queue with stale data is precluded.

Data for a logical unit, such as a logical block address, may be added to the cache in a particular physical resource. A subsequent host operation (e.g., a write operation) may overwrite that logical unit. As a result, data associated with a particular physical resource, or the original data, may be part of the cache's queue, but may be stale or invalid. In the above example, the physical resource, unit 7, occupied by stale data cannot be used until the front of the tail advances and moves past unit 7. In this case, even if it were desirable to use the units between the front and the back of the queue that have stale or cleaned data, the cache cannot accept any more data into a cache. Thus, even though there are unused and stale units in the cache, due to the SMR implementation, the unused and stale units cannot be used for storing information. Given a certain workload, these circumstances may significantly reduce the usefulness of the cache.

The more efficient data to remove from the queue is the stale data. Unfortunately, as discussed above, while a unit that contains stale data is in the queue, it is not reusable, and so the cache may still not be able to accept new data because the front of the queue may not advance beyond a position that is the minimum safe distance from the back of the queue. The front of the queue may or may not contain data that is optimal to move out of the cache.

The disclosed technology involves segregating a disk cache into allocation units (which may be shingled units, or bands), isolating the units from one another magnetically, with a unit size based on certain desired parameters to attain optimal granularity and density, and thus enabling out-of-order reuse of the disk cache physical resources (e.g., fixed- or dynamically-sized units of disk space). The allocation units may be further divided into smaller, sub-allocation units. Isolation space between the units is selected such that writing to a particular isolated unit does not corrupt the downstream isolated unit of the cache.

In one implementation, wherein there are six isolated allocation units each of the size of five tracks, the write corruption distance and the size of the isolation spaces may be one track. In other words, the size of each of the five isolation spaces in between the six isolated SMR units may be ⅕ of an isolated allocation unit. The size of the isolation spaces is minimized and is determined by the size of the writer and/or other physical limitations of the storage device. By enabling SMR in the disk cache, a minimum amount of media may be used as cache for a given capability requirement relative to a workload. By specifically creating isolation space between disk cache allocation units, the disclosed invention enables out of order use and reuse of the allocation units. This improves the flexibility of the caching system for most workloads, with faster cache cleaning service rates, better overall throughput, and higher overall efficiency, without affecting hit rate, fill rate, or density of the disk cache.

Although the configuration described here involves segregating the units individually (in single allocation units), in another implementation at least two of the plurality of allocation units adjacent to each other may be conjoined (combined together), with the goal of more effective cache fill. In such case, the isolated region may be utilized for storing data between at least two of the plurality of conjoined, allocation units, providing an increased effective disk cache size for the same physical area. Further, it is not necessary that each of the isolated allocation units on the SMR is of the same size. For example, for an SMR cache divided into ten isolated allocation units, the first five cache units maybe twice as large as the last five units, with same size of isolation units between them. Alternatively, variable size of isolated allocation units may be provided with the size of the isolated allocation units being determined based on the workload.

To further illustrate this teaching, in one example with a 35-track cache, there may be six 5-track units, and five isolation tracks positioned between the 5-track units. In such example, the order of positioning may include: tracks 1-5 in a unit, track 6 is an isolation space, tracks 7-11 in a unit, track 12 is an isolation space, tracks 13-18 in a unit, track 18 is an isolation space, tracks 19-23 in a unit, track 24 is an isolation space, tracks 25-29 in a unit, track 30 is an isolation space, then lastly, tracks 31-35 in a unit. A consecutive set of tracks may be selected for cleaning and transition into isolation tracks and payload tracks. In this example, tracks 13-17 and 19-23 may be selected because of a high count of stale data, a low count of main store units that will be cleaning targets, and a low count of valid data to be copied to the back of the queue. After cleaning and copying, tracks 13-23 may be formed to be an 11-track allocation unit, transforming track 18 from an isolation space to part of the cache space. At some time, after data is written to the units of the isolated allocation units, the remaining valid unit may be cleaned.

In some implementations, filling, cleaning, and emptying the disk cache are carried out according to a predetermined cache policy or algorithm. The banding of the disk cache enables flexibility and dynamism in policy selection. A policy of preferential allocation of disk cache units in the free pool may be based on varying characteristics, such as the physical location of the allocation unit including the location on the radius and the particular head/surface, the data rate of the physical unit, the logical contents of already-allocated physical units adjacent to the one to be allocated, the "heat" of the data (level of activity) in adjacent units, etc. Such policies provide optimizing instructions for management of data removal and usage.

For example, reusing and/or cleaning the most stale data first may be desirable. In such a case, a policy to reuse the most stale unit first may be used. Another implementation may include a "least recently used" (LRU) policy, wherein the least recently written, read, or overwritten data is cleaned or moved out of the cache. A "last in, first out" (LIFO) policy may also be used in another implementation. A LIFO policy reuses the last data added to the cache first. In another implementation, a random reuse policy may be used whereby data is reused in a random order. Cleaning the fewest number of backing store units may be desirable. In such a case, a policy to clean and then reuse the cache unit with the fewest affected backing store units first may be used.

In another implementation, a lowest cost policy may be used. A lowest cost policy may entail where stale data is near zero cost, valid data cleaned to a non-SMR backing store is a small cost (per unit of data such as a block or sector), valid data copied to the back is moderate cost, and valid data cleaned to an SMR backing store is high cost. The device can evaluate all units and select a lower or lowest cost to clean and make available for reuse.

In another implementation, a host workload-induced reuse policy may be used in order to prevent reliability issues and avoid excess work. For example, if a single allocation unit is reused over and over to the exclusion of other units, for example in cases involving Adjacent Track Interference and Side Track Erasure, undesirable compensation may be induced. A host may indicate that certain hot data is fast (or cache) data and a device may analyze data based on host directives or hint commands.

In another implementation, to determine allocation unit size, as part of an allocation policy, the size of the allocation of an isolated portion of the disk cache to a particular data to be cached may be decided dynamically at the time of the allocation. Such selection of an allocation unit size may be based on, for example, the type of data, the size of data, etc.

As an example, cleaning policies may be based on data heat. The data heat may be determined, for example, based on the number of access requests made to a certain part of the media per unit time. There may be different weights given to data heat levels. If a particular score calculated using a weighted combination of such values is above a certain threshold, and data to be cached has high data heat (read heat or write heat), a disk cache unit that is more easily accessible than other disk cache units is allocated to such high heat data.

The following figures illustrate the method and apparatus of the disclosed technology. In the following description, reference is made to the accompanying drawing that forms a part hereof and in which are shown by way of illustration at least one specific embodiment. In the drawing, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a block diagram of an example data storage system 100, showing the various functional components used to control the operation of a data storage device 110 (e.g., an SMR HDD, an SMR SSHD, an object storage device, etc.). The system 100 includes a computing or host device 102 (e.g., a computer, a mobile device, the internet, etc.) operably connected to the data storage device 110, each of the host device 102 and the storage device 110 communicating with each other.

A processor 104 is located in the host computer 102. The processor 104 sends one or more read or write commands (or a put and a get command in case of an object storage device) to a disk drive storage controller 112 for execution. The disk drive storage controller 112 uses a storage media 114 in the storage device 110. As control communication paths are provided between a host device 102 and the disk drive storage controller 112, the disk drive storage controller 112 provides communication and control for the data storage device 110.

The storage media 114 may be one or more of a variety of tangible media (excluding carrier waves and communication signals), including hard disc drives and solid state hybrid drives, store data on magnetic media, as well as optical media, solid state media such as NAND, NVRAM, Resistive RAM (ReRAM), Magnetic RAM (MRAM), Phase Change Memory (PCM), and other advanced and staid memory technologies.

The storage device 110 includes a non-volatile cache 116 that is either a storage area on the storage media 114 and/or another non-volatile memory accessible by the storage device 110. In the depicted system 100, the cache 116 is a storage area on the storage media 114. The disk drive storage controller 112 may write data to physical resources or units in the storage media 114. Back-up copies of data can be copied to non-volatile memory or physical resources (e.g., units 122a-e) located in the cache 116 as part of an execution of the write command. Alternatively, the cache 116 may also be used as a read cache to temporarily store data read from the storage media 114. The cache 116 receives communications and controls managed from a cache controller manager 120 located in the storage device 110. In some implementations, the cache controller manager 120 may comprise of tables, programs, etc. that facilitate management of the case.

In the disclosed technology, the physical resources in the cache 116 are allocation units, which may be shingled. As depicted in the exploded view 128, shingled units, or units 122a-e, are isolated with isolation space between the shingled units.

As described in more detail below in FIG. 2, data may be stored on the units and later reused out-of-order in the disclosed technology. For example, data may be reused out-of-order from shingled unit 122c via a command 124, and then used from shingled unit 122e via a command 126. In comparison, ordered reuse of data would reuse from units 122a, then 122b, then 122c, then 122d, then 122e. The storage controller 112 may keep a mapping, or log, of the use and reuse of the shingled units 122a-e when an out of order reuse scheme is implemented. In one implementation, the reusing of the units 122a-e may be performed randomly. Alternatively, the order of reusing the units 122a-e may be based on a workload on the cache 116.

Figure 2:
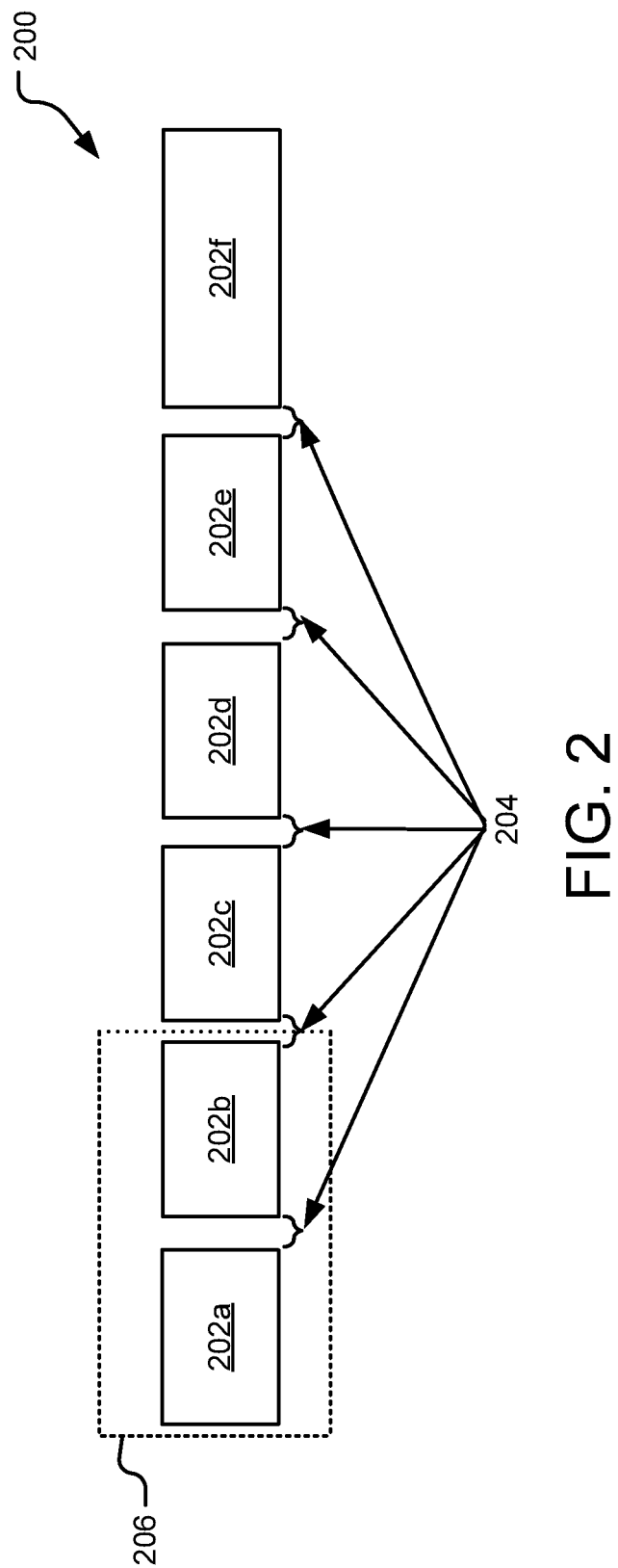
FIG. 2 illustrates a diagram of example isolated allocation units in a disk cache.

FIG. 2 illustrates a diagram of example isolated shingled units (bands) in a disk cache 200. For example, in one implementation, six bands 202a-202f in a cache are shown. The bands 202a-f are expanded out in the cache, magnetically isolated from one another. In between the units 202a-f are isolation spaces 204, or write-forward corruption distances. The distance is dependent on a combination of SMR head structure and track spacing, or pitch. As shown, the units are not required to be used in forward order because they are isolated by the sufficiently large write corruption distance. Note that while each of the units 202a-202e is illustrated to have the same size, they may be units of different size, as shown in unit 202f. There may be write corruption distances of different size as well, including write corruption distance of zero units.

In another implementation, at least two of the plurality of shingled units adjacent to each other may be conjoined to each other. For example, units 202a and 202b in FIG. 2 may be conjoined to each other (as shown by dotted lines 206) rather than have isolation space between the two units, and the space previously used for isolation becomes part of the capacity of the conjoined units which increases the total effective cache size. In one implementation, such conjoining of the units may be in done in real-time. For example, if it is requested that a large block of data is to be cached, the disk controller may determine to conjoin the units and store the large block in the conjoined unit 206. Again, a program at the disk controller may keep track of status of the units that are conjoined.

As described above, each of the shingled units in the disclosed technology may be reused out-of-order. For example, unit 202b may be reused, then unit 202d may be reused. A reuse policy (e.g., lowest cost, FIFO or LRU) may be implemented for the reuse of units.

Figure 3:
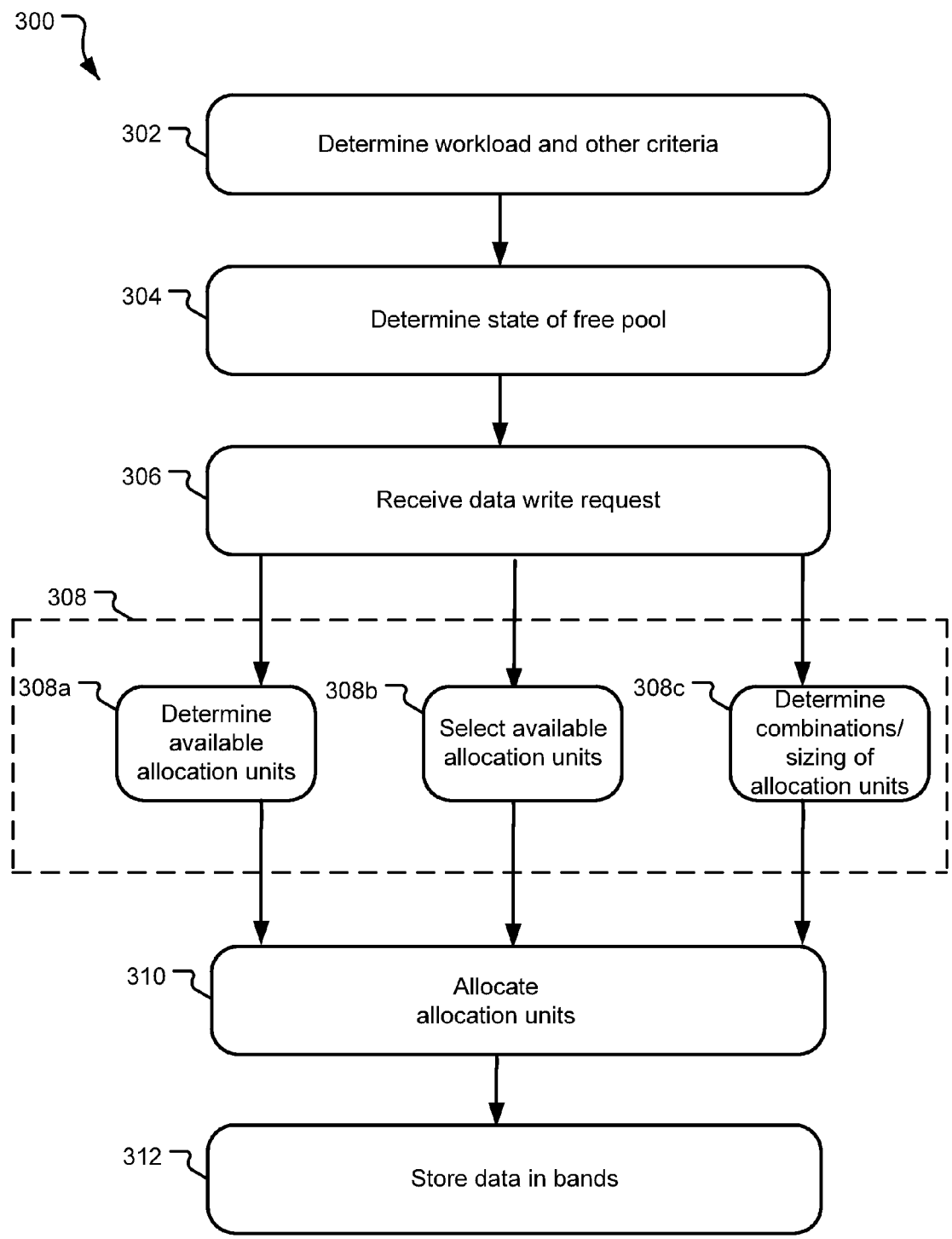
FIG. 3 illustrates a flowchart of example operations for allocation of the isolated allocation units in a disk cache.

Referring now to FIG. 3, example operations 300 depict example operations for allocating isolated allocation units in a disk cache. A determining operation 302 determines the workload on a cache and one or more other criteria for storing data to the cache. For example, an example criteria may be an expected average size of cache data requests, an expected frequency of cache data requests, etc. Another determining operation 304 determines the state of the free pool. The disk cache receives a data write request in a receiving operation 306. For example, such data write request may be received in response to a host write command, in response to a rude power shutdown, in response to a media reorganization operation, as part of speculative pre-fetching of data not yet requested by the host, etc.

An operation 308 comprises three operations that can occur individually, simultaneously (in parallel), serially, or interchangeably. In a determining operation 308a, available allocation units are determined. Some allocation units may be physically adjacent to each other, other may not be physically adjacent to one another. In an operation 308b, specific available allocation units are selected. In a determining operation 308c, combinations and sizing of allocation units are determined. Within determining operation 308c, rearrangement of allocation units may be made prior to writing the new data to cache. In one implementation, the size of the allocation units and the isolation spaces may be determined based on a number of items, including the workload and other criteria determined at operation 302.

In the determining operation 308c, a variety of sizing policies may be executed. For example, sizing may be based on a first fit policy, wherein the first allocation unit is selected or, the first available allocation unit that is large enough. A best fit policy may be used, which involves a determined amount of disk space needed, and of the available allocation units, the unit of best fit is selected. In another implementation, a closest media policy may be used to select allocation units physically closest or adjacent to the media. Another example of a sizing policy may be a least isolation policy, which reduces overhead associated with isolation.

Referring back to FIG. 3, after sizing of allocation units is performed, the allocation units are allocated in an allocation operation 310. Allocation may occur out of order. Data is then stored in a band, or the allocation units, in a storing operation 312.

Figure 4:
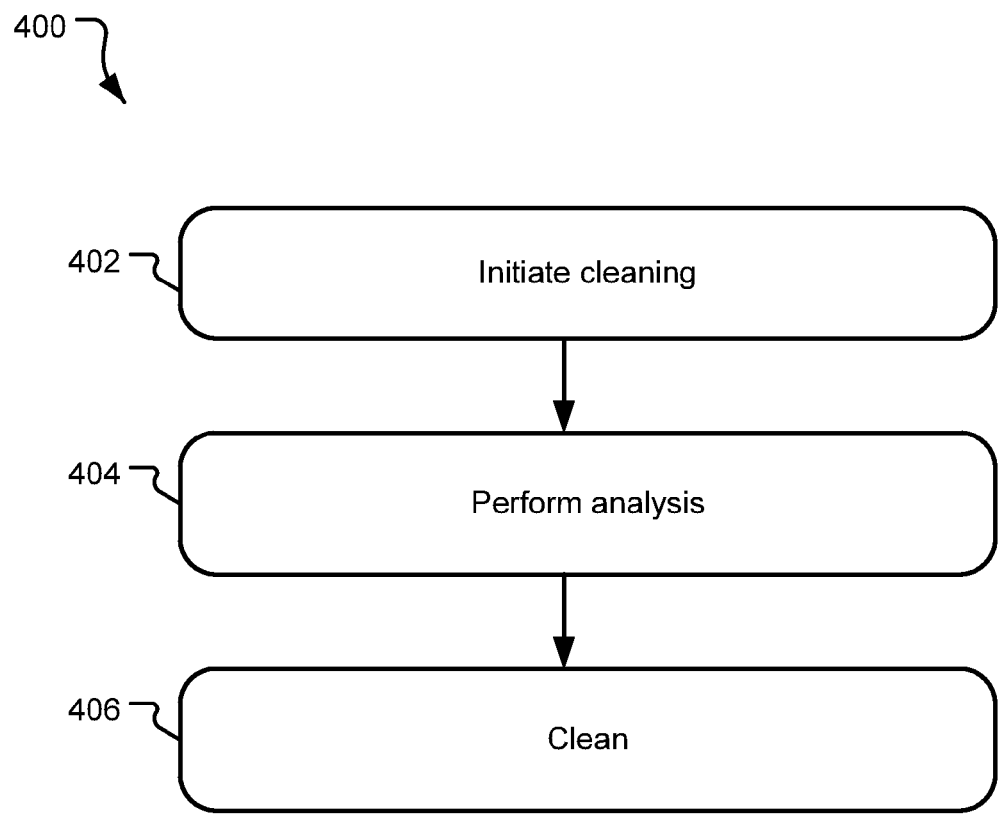
FIG. 4 illustrates a flowchart of example operations for cleaning a pool of allocation units.

FIG. 4 illustrates example operations 400 for cleaning data out of allocated units so that the units may be a part of the free allocation pool. An operation 402 initiates cleaning valid data out of allocation units so the units may be reused in a free pool. Cleaning may be initiated, for example, based on a clock, a clean request received, a certain threshold, instigation from an external process (e.g., the host).

Analysis for cleaning is performed in an analyzing operation 404. Determining which allocation units should be cleaned may be based on certain criteria, such as whether there is hot data or what a current or future cost of cleaning may be. Cleaning may be performed out of order. In one implementation, it may be determined that data may be discarded instead of cleaning. Cleaning is performed in a cleaning operation 406. Such cleaning may include cleaning the most stale data, or using a LRU or LIFO policy.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory, ReRAM, STT-MRAM, holographic memory, solid-state non-volatile memory, and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
   determining a workload on a shingled disk cache with a storage device controller;
   determining a state of a free pool of the shingled disk cache;
   receiving a data write request to the shingled disk cache;
   segregating the free pool of the shingled disk cache into a plurality of allocation units;
   allocating the plurality of allocation units out of order, as compared to a physical arrangement order of the allocation units in the shingled disk cache, based on the workload; and
   storing data in the plurality of allocation units.

2. The method of claim 1, further comprising cleaning a plurality of allocation units.

3. The method of claim 2, wherein cleaning a plurality of allocation units is prioritized based on the relative staleness of data stored in the plurality of allocation units.

4. The method of claim 2, further comprising:
   selecting an allocation unit for cleaning based on a best cost function score among all candidate allocation units, the best cost function further comprising a cost to migrate stale data, a cost to migrate clean data, and a cost to clean dirty data based on its destination.

5. The method of claim 2, further comprising cleaning a plurality of allocation units from the shingled disk cache based on the frequency of use for data stored in the plurality of allocation units.

6. The method of claim 1, further comprising conjoining of at least two of the plurality of allocation units that are physically adjacent.

7. The method of claim 6, wherein the plurality of conjoined allocation units are used to store data.

8. The method of claim 1, wherein track isolation between the plurality of allocation units is based on one or more characteristics of the recording apparatus.

9. The method of claim 1, further comprising allocating the plurality of allocation units based on a criterion related to host workload.

10. The method of claim 2, further comprising cleaning the plurality of allocation units based on a criterion related to host workload.

11. The method of claim 1, further comprising emptying the plurality of allocation units in non-sequential order.

12. The method of claim 1, further comprising sizing of the plurality of allocation units based on a characteristic of the data to be cached.

13. The method of claim 12, wherein sizing of the plurality of allocation units is based on at least one of the sizing policies of first fit, best fit, closest media, and least isolation.

14. An apparatus, comprising:
   a shingled magnetic recording storage device including a disk cache of the storage device segregated into a plurality of allocation units; and
   a storage device controller configured to determine a workload on the disk cache, determine a state of a free pool of the disk cache, segregate the disk cache into a plurality of allocation units, receive a write request to the storage device, and allocate the plurality of allocation units out of order, as compared to a physical arrangement order of the allocation units in the shingled disk cache, based on the workload in response to the write request.

15. The apparatus of claim 14, wherein at least two write corruption distances are of different size.

16. One or more computer-readable storage media encoding computer-executable instructions for executing on a computer system a computer process that reuses disk cache physical resources, the computer process comprising:
   determining a workload on a shingled disk cache with a storage device controller;
   determining a state of a free pool of the shingled disk cache;
   receiving a data write request to the shingled disk cache;
   segregating a shingled disk cache into a plurality of allocation units;
   allocating the plurality of allocation units out of order, as compared to a physical arrangement order of the allocation units in the shingled disk cache, based on the workload; and
   storing data in the plurality of allocation units.

17. The one or more computer-readable storage media of claim 16, wherein the computer process further comprising combining the allocation units in response to a write request based on closeness of the allocation units.

18. The method of claim 1, wherein segregating the shingled disk cache into a plurality of allocation units further comprises determining sizing of the plurality of allocation units.

19. The method of claim 18, wherein determining sizing of the plurality of allocation units is based on the determined workload.

20. The method of claim 18, wherein determining sizing of the plurality of allocation units is based on at least one of a first fit policy, a best fit policy, a closest media policy, and a least isolation policy.

* * * * *